Nov. 11, 1930.  M. P. REYNOLDS  1,781,526
APPARATUS FOR SCREENING MATERIALS
Filed April 28, 1926   2 Sheets-Sheet 1
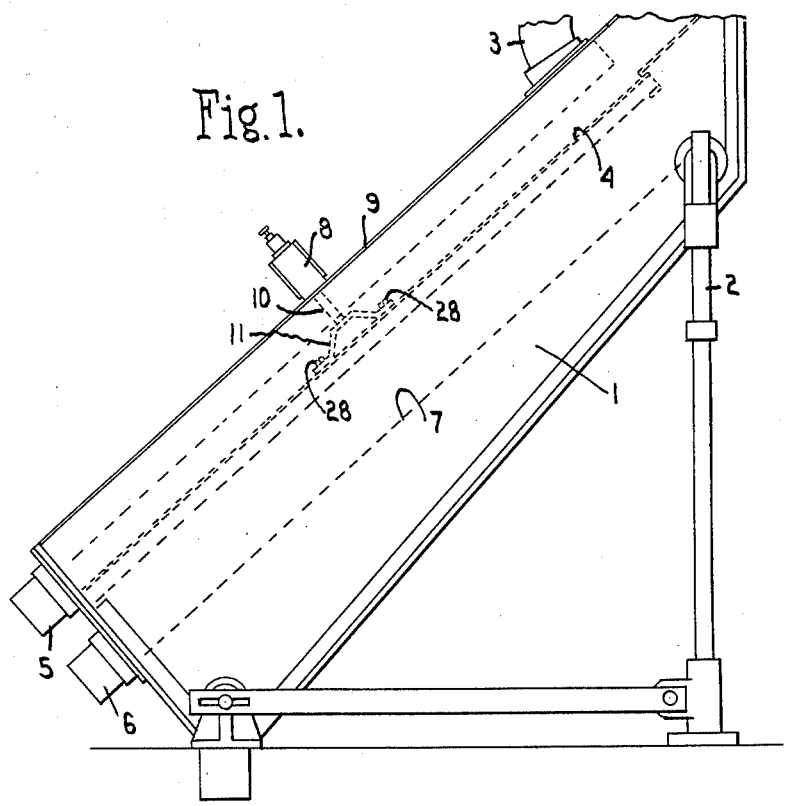
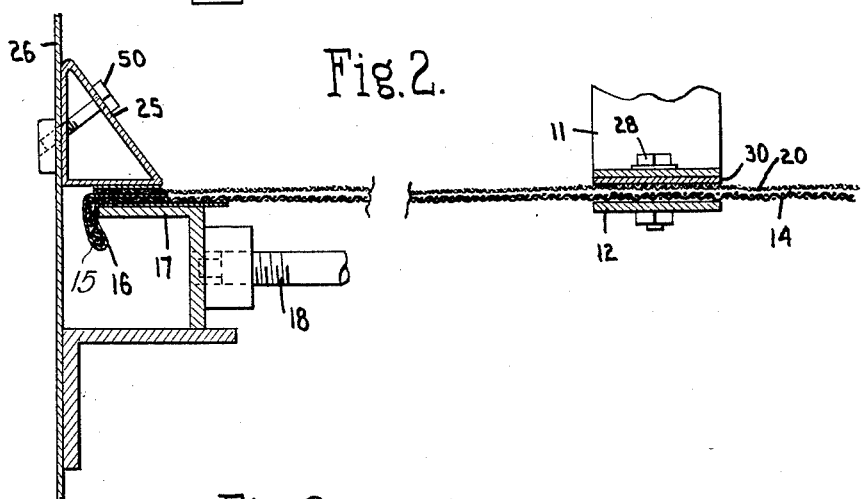
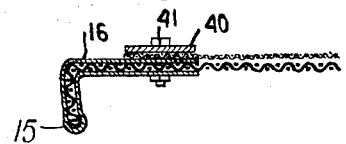
INVENTOR.
Morley Punshon Reynolds

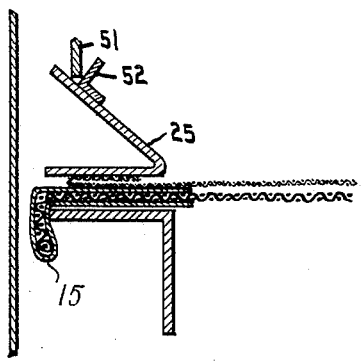
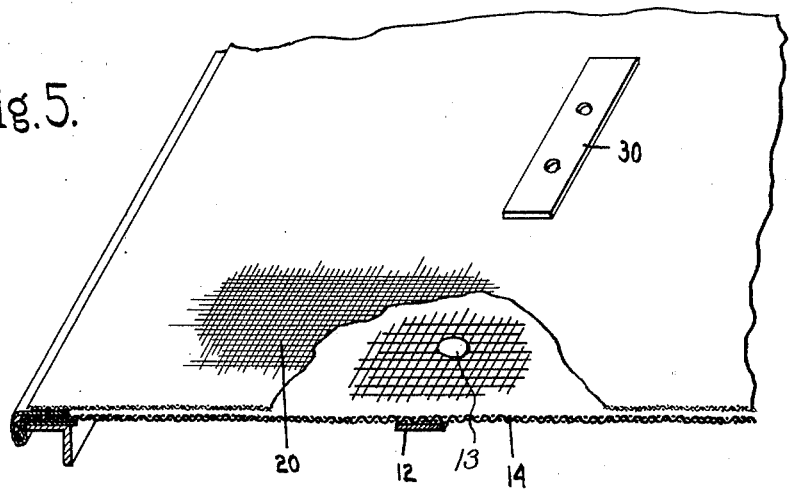

Patented Nov. 11, 1930

1,781,526

UNITED STATES PATENT OFFICE

MORLEY PUNSHON REYNOLDS, OF CLEVELAND HEIGHTS, OHIO, ASSIGNOR TO THE W. S. TYLER COMPANY, OF CLEVELAND, OHIO, A CORPORATION OF OHIO

APPARATUS FOR SCREENING MATERIALS

Application filed April 28, 1926. Serial No. 105,113.

The present invention, relating as indicated to an apparatus for screening materials, is more particularly directed to an apparatus for classifying or screening moist or sticky materials, such as clay, various ores and other materials which have heretofore been extremely difficult to screen accurately and rapidly because of the nature of the material, which causes it to stick in the meshes of the screen, thus clogging the screen and reducing its capacity. Even with the most effective vibration so far known it has been impossible to screen sticky materials with anything like the same rapidity as dry materials because of this clogging of the screen, which did not seem to be affected materially by even the sharpest kind of vibration.

The present invention is directed to an improved apparatus for screening the above described type of material. It consists, briefly stated, in a screening mechanism in which a vibrating woven wire screen cloth is suitably supported in a non-vibratory condition, that is, a condition in which the cloth is untensioned to a natural vibratory state while said screen is simultaneously supported by a stronger, coarser woven wire screen and said supporting screen is simultaneously vibrated to cause it to strike or whip the first screen. In this way the coarser or stiffer supporting screen is used to impart a very much more intense vibration to a fine screen than is possible through directly vibrating the fine screen, and at the same time the movement of the fine screen is extended throughout its entire area by reason of its contact all over its surface with the coarser supporting screen. The present apparatus possesses a marked difference from apparatus heretofore employed in that it provides for a whipping of the entire surface of the operating screen, that is, the finer woven screen is held in the upper position, and thus loose particles of material which are stuck in the meshes of the fine screen are effectively shaken which, maintains this screen open at all times and capable of screening at full capacity.

My improved apparatus consists of a loosely tensioned relatively fine woven wire screen and a second screen supporting the first and tensioned to a true vibratory condition, with means for rapidly vibrating and jarring this coarse or supporting screen, thus forcing the same to vibrate the supporting fine screen and at the same time slap and whip this screen all over its surface by reason of the different rates of vibration or movement in the two screens caused by the tensioned and untensioned condition of the two screens respectively and by the different sizes of wire in the two screens.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one of various ways in which the principle of the invention may be used.

In said annexed drawings:

Fig. 1 is a side elevation of my improved screening apparatus illustrating one form of apparatus which may be employed to carry out my improved method; Fig. 2 is a transverse section through the apparatus of Fig. 1; Fig. 3 is a transverse section on an enlarged scale showing a modification of the means of Fig. 2 for securing the upper or fine screen at its edges; Fig. 4 is a similar view showing still another modification of these means; and Fig. 5 is a view in perspective showing one means for securing the screen at its center.

Referring now to Fig. 1, there is shown an inclined screening apparatus consisting of a box-like casing 1 disposed in an inclined position on adjustable supports 2 and provided with means in the form of conduits 3 feeding material in bulk onto the upper end of the operating screen 4. The casing discharges oversize materials through a chute 5 and the undersize materials through a second chute 6, disposed below the level of the screen. The materials are directed into this undersize chute by a plate-like bottom 7, onto which the material, which passes through the screen, falls.

I employ vibrating apparatus consisting of an electromagnet 8 disposed transversely of the upper inclined side 9 of the casing 1 and provided with an armature 10, which extends into the casing where it is attached to a U-shaped bracket 11. This bracket is in turn secured to resilient vibrating strips 12, which are secured one on either side of a vibratory woven wire screen 14. The vibrating means thus described constitute the apparatus disclosed in my issued Patent No. 1,332,685, and in my co-pending application Serial No. 285,953. The apparatus operates to produce a very rapid up and down movement of the screen which is a maximum along the center, the vibrations being transmitted throughout the entire length of the screen by means of the resilient vibrator strips 12. At each complete impulse of the armature there is violent interruption of the movement which is produced by suitable stop means, which limit the upward movement of the armature, this means producing a sudden stoppage in the movement of the armature, vibrator strips and screen, causing the material to be shaken from the screen surface, this movement also tending to break loose any material which is stuck in the meshes of the screen.

Referring now to Fig. 2, a woven wire screen 14 is shown fastened along its center to a longitudinally extending centrally disposed resilient strip 12 by means of flat-headed rivets or bolts 13, which project but little if any above the upper surface of this supporting screen 14. At either side the edges of the screen are secured within a re-bent L-shaped strip of metal 15, the downwardly extending flange 16 of which serves to engage over a transversely movable angle bar 17 suitably supported in the frame 1. After the screen 14 has been positioned with flanges 16 on the strips 15 in engagement with the upper flange of the angles 17, the latter are moved away from each other by means of right and left-hand threaded bars 18 until the screen 14 has been brought to uniform vibratory tension, in which condition the screen is capable of being truly vibrated by means of the vibrating apparatus already described.

Disposed above the screen 14 already described, which is a screen of relatively coarse mesh, is a lighter screen 20 of suitably finer mesh. This screen 20 may be secured in various ways, three of which are shown in Figs. 2, 3, 4 and 5. The light screen may be held at its outer edges between the upper surface of the strips 15 and triangular guard members 25, (see Figs. 2 and 4) which, when inserted against the sides 26 of the casing, rest upon the upper surface of the fine screen 20. These guard members extend the entire length of the side walls of the casing and are ordinarily employed to prevent loss of material over the lateral edges of the screen.

The guard members 25, which may be of various forms, two of which are shown in Figs. 2 and 4, respectively, are held in position by suitable means, such as bolts 50 (Fig. 2) or by downwardly extending arms 51 (see Fig. 4) engaging in the angle formed between the outer side of the guard and brackets 52 secured thereto. The engagement of the fine screen 20 by these guard members is such that the fine screen is not actually tensioned during the tensioning of the coarser screen, although it may be drawn into a relatively taut and level condition when first applied. As soon, however, as material flows over the light screen the weight of this material stretches the wires of the fine screen and sags this screen into a contact all over its surface with the lower supporting screen.

At its center the fine screen 20 is secured to the vibrating strip in the following manner. The screen is placed over the surface of the lower screen 20 and a plate 30 is then placed against the outer surface of the light screen and above the vibrating strip 12, to which this plate is secured by means of bolts 28 which pass through the two strips 30 and 12 and the means held therebetween and also through the two ends of the bracket 11 secured to the armature member 10. To attach or remove the fine screen it is only necessary to first remove the bolts 28, lift the bracket 11 and the plate 30 off from the screen when the old screen may be removed and a new one replaced, the new one of course being provided with suitably disposed openings to permit the passage therethrough of the bolts 28.

In Fig. 3 I have shown another means for securing the upper or fine screen in position. In this construction the upper screen is laid upon the upper surface of the retaining strip 16 which clamps the edge of the coarse screen. Disposed on top of the fine screen is a strip of metal 40 extending the entire length of the screen and secured to the screen and in turn securing the screen to the lower clamping strip 16 by means of bolts 41. In this way the edge of the fine screen may be removably secured in such a way that it is a simple matter to remove the strip 40 and permit the withdrawal of the old screen and substitution of a new one.

It will be understood that the upper or fine screen while it is not tensioned to any vibratory condition as is the lower screen, may be tensioned to such a degree that it normally lies in a single level plane but is readily sagged into contact all over its surface with the lower screen by the weight of material which passes over it.

My improved method of screening damp or sticky materials consists in passing a screenable layer of material over a woven wire screen in which the screen is a composite one and consists of two screens. Of these two screens one is a loosely tensioned or untensioned sheet of finely woven wire screen, while the other, which is a lower or supporting screen, is of coarser and stronger mesh and is tensioned to uniform vibratory tension. The method also includes the vibrating at an extremely rapid rate of this heavy supporting screen, thereby causing the supporting screen to vibrate the supported fine screen at a rate and in the manner which is inevitably different in the two screens by reason of their different periods of vibration and also by reason of the fact that only one of the screens is really under vibratory tension. The mesh of the lower or supporting screen may, of course, be varied under different conditions and may be between 2 inch opening and $\frac{1}{16}$ of an inch opening, while the wires of the supporting screen may vary from $\frac{3}{8}$ to .020 of an inch in diameter, the diameter of the wire depending upon the weight of the material to be handled and the fineness of the upper screen which it is desired to use with the supporting screen.

As a result of the construction and mounting of the screens and the action thus imparted to them, the upper or finely woven screen is both vibrated and whipped to cause the material to move down the surface and pass through the meshes of the screen and this screen is also sharply jarred by the stopping of the vibrating mechanism during each impulse. It will be recognized that the material will sag the fine screen into contact with the coarse screen but that the movements of the two screens cannot under any ordinary operating conditions be identical. The light or upper screen is in a relatively untensioned condition and is sagged into contact with the supporting screen by the material passing over it. Also it has a natural weight of movement depending upon the transverse length, caricature of the screen, method of securing the edges and center, and the load of the material.

The supporting screen on the other hand is brought to a truly vibratory condition which is uniform throughout its area and is of a very much stiffer wire and of a coarser mesh than the upper screen. It is directly vibrated by the vibrating apparatus and its movement is a truly vibratory movement, which is closely analogous to the movement which a bar of spring steel might undergo if its ends were supported and a force were applied intermittently intermediate the ends of the bar to cause it to bend or vibrate. As a result of the different natures and conditioans of the two screens their movements cannot be identical and there is therefore at all times some relative movement between these screens which causes the heavy vibratory screen to strike or slap or whip the upper screen all over its surface and thus break loose any particles of material which have stuck in the meshes of this upper screen.

It will be apparent from the foregoing description that different types of vibratory waves are imparted to the two screens and these waves are necessarily of different characters resulting in a continuously relative movement between the two screens. That is, the vibrators in the two screens are out of step and the resultant relative movement produces the whipping of the light screen by the heavier supporting screen. This action causes a very much more effective vibration and results in a marked increase in the capacity and a considerable decrease in the tendency of the screen to clog or blind.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:—

1. In apparatus of the character described, the combination of a stationary frame, a woven wire screen supported in an inclined position in said frame, said screen being engaged along two opposite edges in said frame and being tensioned to a uniform vibratory tension, a second woven wire screen of considerably finer mesh than said first-named screen supported upon said first-named screen in an untensioned condition, and means for rapidly vibrating said first-named screen.

2. In apparatus of the character described, the combination of a stationary frame, a woven wire screen supported in an inclined position in said frame, said screen being engaged along two opposite edges in said frame and being tensioned to a uniform vibratory tension, a second woven wire screen of considerably finer mesh than said first-named screen supported upon said first-named screen in an untensioned condition, means for rapidly vibrating said first-named screen, and means for bringing said vibrating screen to a jarring stop upon each vibratory impulse thereof.

3. In apparatus of the character described, the combination of a stationary frame, a woven wire screen disposed in said frame in an inclined position and having two opposite edges engaged in said frame, said screen being tensioned to a uniform vibratory tension, a second woven wire screen of considerably finer mesh disposed above and in contact with said first-named screen, said second screen being supported at the sides corresponding to the engaged sides of said supporting screen by said frame and being secured intermediately said sides to said supporting screen, and means for rapidly vibrating said supporting screen.

4. In apparatus of the character described, the combination of a frame, a woven wire screen disposed in said frame in an inclined position and having two opposite edges engaged in said frame, said screen being tensioned to a uniform vibratory tension, a second woven wire screen of considerably finer mesh disposed above and in contact with said first-named screen, said second screen being supported at the sides corresponding to the engaged sides of said supporting screen by said frame and being secured intermediately said sides to said supporting screen, a resilient strip secured centrally to said supporting screen parallel to the engaging sides of the same, and means for imparting vibrations to said resilient strip whereby such vibrations are transmitted throughout the entire length of said supporting screen and from said supporting screen throughout the entire surface area of said second screen disposed thereon.

5. In apparatus of the character described, the combination of a frame, a woven wire screen disposed in said frame in an inclined position and having two opposite edges engaged in said frame, said screen being tensioned to a uniform vibratory tension, a second woven wire screen of considerably finer mesh disposed above and in contact with said first-named screen, said second screen being supported at the sides corresponding to the engaged sides of said supporting screen by said frame and being secured intermediately said sides to said supporting screen, a resilient strip secured centrally to said supporting screen parallel to the engaged sides of the same, means for imparting vibrations to said resilient strip whereby such vibrations are transmitted throughout the entire length of said supporting screen and from said supporting screen throughout the entire surface area of said second screen disposed thereon, and means for bringing said resilient strip and said supporting screen to a sudden jarring stop during each vibratory impulse thereof.

6. In apparatus of the character described, the combination of a woven wire screen, stationary frame members engaging the side edges of said screen, means for adjusting said sides to impart a uniform vibratory tension to said screen, a second woven wire screen of considerably finer mesh disposed above said first-named screen, said second screen being supported at the sides corresponding to the engaged sides of said supporting screen, and means for rapidly vibrating said supporting screen.

7. In apparatus of the character described, the combination of a stationary frame, a woven wire screen supported by said frame, said screen being engaged along two opposite edges in said frame and being tensioned to a uniform vibratory tension, a second woven wire screen of considerably finer mesh than said first-named screen mounted above and closely parallel to said first screen, said second screen being untensioned and supported along its edges corresponding to the engaged edges of said first screen.

Signed by me, this 22nd day of April, 1926.

MORLEY PUNSHON REYNOLDS.